US012027036B2

(12) United States Patent
Lamb et al.

(10) Patent No.: US 12,027,036 B2
(45) Date of Patent: Jul. 2, 2024

(54) REDUCED FALSE ALARM SECURITY SYSTEM

(71) Applicant: Ecolink Intelligent Technology, Inc., Carlsbad, CA (US)

(72) Inventors: Michael Lamb, Carlsbad, CA (US); Kenneth Sweeney, Carlsbad, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 0 days.

(21) Appl. No.: 18/190,797

(22) Filed: Mar. 27, 2023

(65) Prior Publication Data

US 2023/0237899 A1 Jul. 27, 2023

Related U.S. Application Data

(62) Division of application No. 17/108,169, filed on Dec. 1, 2020, now Pat. No. 11,631,320, which is a division (Continued)

(51) Int. Cl.

*G08B 29/00* (2006.01)
*G08B 3/10* (2006.01)

(Continued)

(52) U.S. Cl.

CPC ............. *G08B 29/185* (2013.01); *G08B 3/10* (2013.01); *G08B 5/36* (2013.01); *G08B 13/08* (2013.01);

(Continued)

(58) Field of Classification Search

CPC .... G08B 29/185; G08B 29/02; G08B 25/002; G08B 25/10; G08B 29/00; G08B 29/16;

(Continued)

(56) References Cited

U.S. PATENT DOCUMENTS 6,225,903 B1 5/2001 Soloway et al.
7,916,018 B2 3/2011 Eskildsen et al.

(Continued)

FOREIGN PATENT DOCUMENTS

EP 1686551 A2 8/2006
EP 2393071 A2 12/2011

(Continued)

OTHER PUBLICATIONS

English translation of office action from Brazilian application No. BR112018072093-3, 2 pp.

(Continued)

*Primary Examiner* — James J Yang
*Assistant Examiner* — Anthony D Afrifa-Kyei
(74) *Attorney, Agent, or Firm* — Greenberg Traurig, LLP

(57) ABSTRACT

Embodiments of a central security monitoring device for reducing incidences of false alarms in a security system is disclosed. In one embodiment, a method is described, comprising receiving an alarm signal from an occupancy sensor via a receiver, receiving a second alarm signal from a barrier alarm device after receiving the alarm signal, determining, by a processor, an elapsed time from when the alarm signal from the occupancy sensor was received to when the second alarm signal from the barrier alarm device was received, transmitting, by the processor via a network interface, a message to a personal communication device indicating that a false alarm has occurred when the elapsed time is less than the predetermined time.

16 Claims, 4 Drawing Sheets

Related U.S. Application Data of application No. 16/266,914, filed on Feb. 4, 2019, now Pat. No. 10,854,069, which is a division of application No. 15/455,442, filed on Mar. 10, 2017, now Pat. No. 10,210,748, which is a division of application No. 15/139,911, filed on Apr. 27, 2016, now Pat. No. 9,613,524.

(51) Int. Cl.

| | |
|---|---|
| ***G08B 5/36*** | (2006.01) |
| ***G08B 13/08*** | (2006.01) |
| ***G08B 25/00*** | (2006.01) |
| ***G08B 29/18*** | (2006.01) |

(52) U.S. Cl.

CPC .......... *G08B 25/008* (2013.01); *G08B 25/001* (2013.01)

(58) Field of Classification Search

CPC ...... G08B 29/046; G08B 25/00; G08B 25/01; G08B 25/009; G08B 25/001; G08B 25/008; H04L 67/12; H04L 67/00; H04L 67/01; H04L 67/125

See application file for complete search history.

(56) References Cited

U.S. PATENT DOCUMENTS

| | | | | |
|---|---|---|---|---|
| 9,613,524 | B1 | 4/2017 | Lamb et al. | |
| 10,210,748 | B2 | 2/2019 | Lamb | |
| 10,854,069 | B2 | 12/2020 | Lamb | |
| 11,631,320 | B2 | 4/2023 | Lamb | |
| 2008/0157964 | A1 | 7/2008 | Eskildsen et al. | |
| 2010/0245088 | A1 | 9/2010 | Meier et al. | |
| 2015/0130608 | A1* | 5/2015 | Sharma ................ | G08B 25/008 340/501 |
| 2017/0018167 | A1* | 1/2017 | Dey ....................... | G08B 25/14 |
| 2017/0039841 | A1 | 2/2017 | Wilson et al. | |

FOREIGN PATENT DOCUMENTS

| | | |
|---|---|---|
| JP | 02170298 | 7/1990 |
| WO | 2016/109335 A1 | 7/2016 |

OTHER PUBLICATIONS

Non-final Office Action from U.S. Appl. No. 16/266,914, dated Mar. 27, 2020, 11 pp.

Non-final Office Action from U.S. Appl. No. 15/455,442, dated Mar. 29, 2018, 5 pp.

ISA/US, International Search Report and Written Opinion issued on PCT application No. US17/14368, dated Feb. 24, 2017, 7 pages.

EPO, extended European search report issued on EP patent application No. 17790029.7, dated Nov. 14, 2019, 8 pages.

* cited by examiner

Continued to Next Page

REDUCED FALSE ALARM SECURITY SYSTEM

CROSS-REFERENCE TO RELATED APPLICATIONS

This application is a divisional of U.S. patent application Ser. No. 17/108,169, filed on Dec. 1, 2020, which is a divisional of U.S. patent application Ser. No. 16/266,914, filed on Feb. 4, 2019, which is a divisional of U.S. patent application Ser. No. 15/455,442, filed on Mar. 10, 2017, now U.S. Pat. No. 10,210,748, which is a divisional of U.S. patent application Ser. No. 15/139,911, filed on Apr. 27, 2016, now U.S. Pat. No. 9,613,524.

BACKGROUND

I. Field of Use

The present application relates to the field of home security. More specifically, the present application relates to reducing the occurrence of false alarms that frequently occur in current home security systems.

II. Description of the Related Art

Security systems for homes and businesses have been around for many years. Often, these systems make use of barrier alarm devices, such as door and window sensors, motion detectors, sound detectors, etc. Door and window sensors typically comprise two distinct parts: a magnet and a reed switch/transmitter assembly. The reed switch/transmitter assembly is typically installed onto a stationary surface, such as a door or window frame, while the magnet is mounted to a movable portion of a door or window. When the door or window is closed, the magnet and reed switch are in close proximity to one another, maintaining the reed switch in a first state indicative of a "no alarm" condition. If the door or window is opened, proximity is lost between the magnet and the reed switch, resulting in the reed switch changing state, e.g., from closed to open or from open to closed. The change of state is indicative of an unauthorized entry, and a signal may be generated by circuitry located within the reed switch assembly and sent, via wires or over-the-air, to a central security panel or gateway in the home, which may forward the signal to a remote monitoring station. In addition, a loud audible alert may be generated, either at the central security panel in the home or directly by the circuitry within the reed switch assembly, indicating that a door or window has been opened.

One problem with these prior-art security systems is the relatively frequent occurrence of false alarms. Most security systems offer a "home" arming feature which arms all door and window sensors, but disables any interior motion sensors. In this way, occupants are able to move about within the home without causing motion sensors to alarm while being protected against unauthorized entry. Often times though, occupants forget that the security system is armed, and when they open a door or a window, a false alarm is triggered. These false alarms sometimes cause a response by police or fire personnel, wasting valuable public resources. Additionally, homeowners may be fined if too many false alarms occur within a certain time period.

It would be desirable to provide a security system that allows occupants to open doors or windows while the security system is in an armed, "home" mode of operation, without triggering an alarm.

SUMMARY

The embodiments described herein relate to various embodiments of a central security monitoring device for reducing incidences of false alarms in a security system. In one embodiment, a method is described, comprising receiving an alarm signal from an occupancy sensor via a receiver, receiving a second alarm signal from a barrier alarm device after receiving the alarm signal, determining, by a processor, an elapsed time from when the alarm signal from the occupancy sensor was received to when the second alarm signal from the barrier alarm device was received, transmitting, by the processor via a network interface, a message to a personal communication device indicating that a false alarm has occurred when the elapsed time is less than the predetermined time.

In another embodiment, a central security monitoring device is described for reducing incidences of false alarms of a security system. In this embodiment, the central security monitoring device comprises a receiver for receiving an alarm signal from an occupancy sensor and a second alarm signal from a barrier alarm device, a memory for storing processor-executable instructions and a predetermined time, a processor, coupled to the memory and the receiver, for executing the processor-executable instructions that cause the central security monitoring device to receive the alarm signal from the occupancy sensor via the receiver, receive the second alarm signal from the barrier alarm device after receiving the alarm signal, determine, by a processor, an elapsed time from when the alarm signal from the occupancy sensor was received to when the second alarm signal from the barrier alarm device was received, and transmit, by the processor via a network interface, a message to a personal communication device indicating that a false alarm has occurred when the elapsed time is less than the predetermined time.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to a security system for reducing the occurrence of false alarms. In one embodiment, such a system uses standard door and window sensors and an occupancy sensor (such as a standard motion detector), each in communication with a central security monitoring device. The central security monitoring device receives signals from the door and window sensors and from the occupancy sensor when doors and windows are opened and when a person is detected inside a building, by the door and window sensors and the occupancy sensor, respectfully. The central security monitoring device uses the signals from these sensors to determine whether a false alarm has occurred when a door or window is opened. For the purpose of the discussions herein, the term entry barrier means a door, a window, a gate, a garage door, or some other object that prevents entry to a building, such as a home or business.

Figure 1:
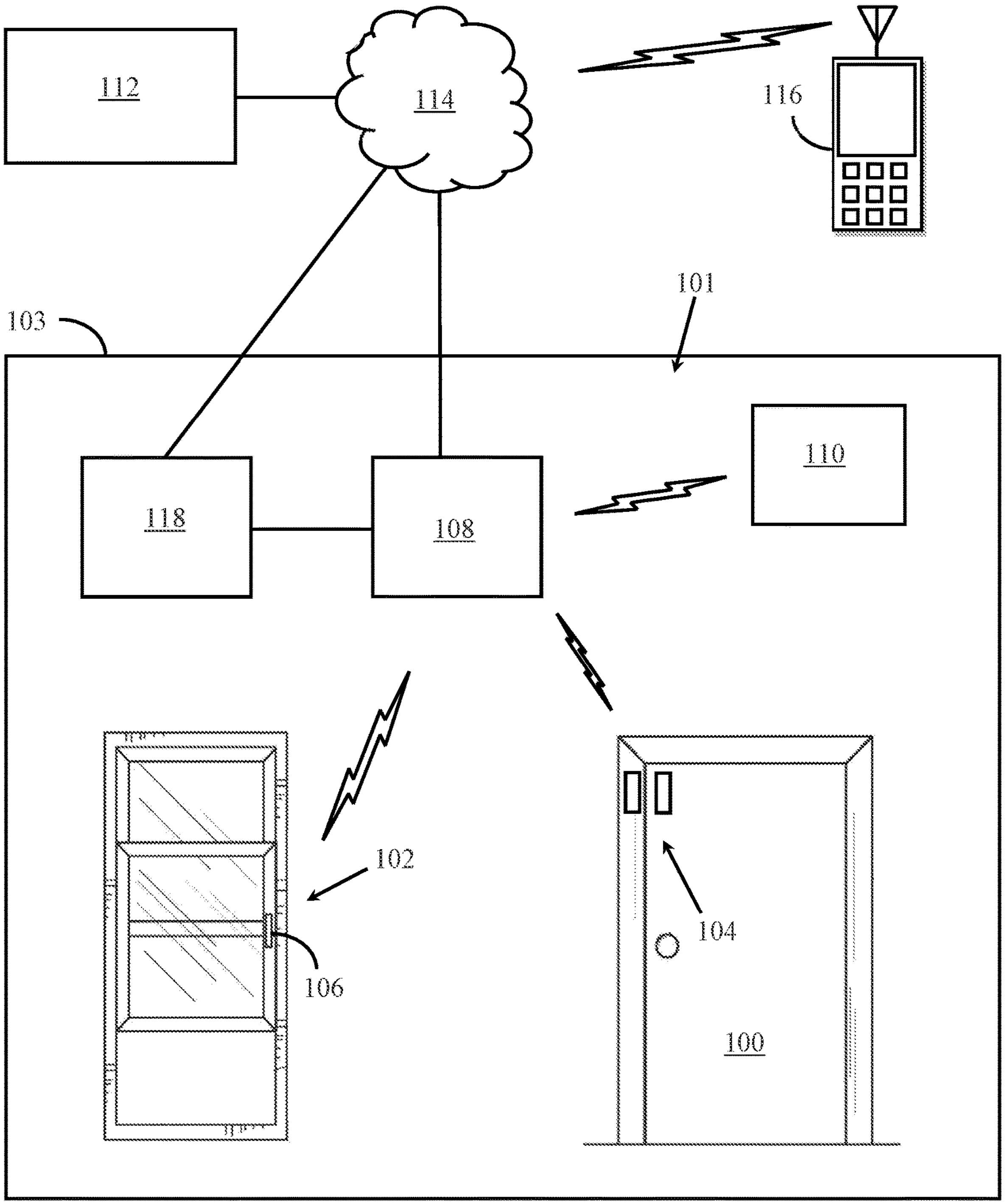
FIG. 1 is a block diagram illustration of a security system inside a building in accordance with one embodiment of the principles discussed herein.

FIG. 1 is an illustration of a security system 101 inside a building 103 in accordance with one embodiment of the principles discussed herein. In this embodiment, a door 100 and a window 102 of building 103 are monitored by "barrier alarm devices", such as door and window sensors 104 and 106, respectively. In one embodiment, door sensor 104 comprises a magnet and a reed switch assembly, as shown, with the magnet mounted to door 100 and reed switch assembly mounted to a door sill. Window sensor 106 comprises a magnet-less type sensor mounted to a movable portion of the window. The door and/or window sensors could alternatively comprise other types of sensors, such as mechanical switches, beam-interruption devices, glass-break detectors, or any other device that can sense when a door or window is opened.

Occupancy sensor 110 is a device that detects the presence of persons inside building 103. For example, occupancy sensor 110 could comprise a motion detector such as a PIR or PID, a thermal detector, a floor pressure sensor, or some other means for determining the presence of a person inside building 103.

It should be understood that although FIG. 1 illustrates only a single door sensor, a single window sensor, and a single occupancy sensor, in most cases such security systems 101 comprise a greater number and/or type of sensors, and that the number and type of sensors shown in FIG. 1 is for illustrative purposes only.

Central security monitoring device 108 comprises circuitry that performs a variety of tasks, such as receive signals from sensors located throughout building 103, and take predetermined actions in response. Additional functionality may include the capability of transmitting signals to the sensors and/or to other devices, such as home automation devices, such as light control devices, thermostats, door locks, etc. Further functionality may include the capability of receiving signals from remote locations, such as remote monitoring station 112 or personal communication device 116, and taking certain actions in response. In one embodiment, central security monitoring device 108 comprises a security control panel, such as those commonly sold by Honeywell, 2Gig, Interlogix, and others, in one embodiment programmed to perform the functionalities of various embodiments of the invention described herein. In another embodiment, central security monitoring device 108 comprises a specialized "hub" capable of one or two-way communication with the sensors and/or other devices, sometimes coupled to a router or gateway to enable IP-based communications with remote devices. In another embodiment, central security monitoring device 108 comprises internal circuitry that allows it to communicate with remote devices directly via wide-area network 114.

Each of the sensors in system 101 communicates with central security monitoring device 108, typically using wireless RF signals generated by the sensors. For example, if door 100 is opened, the reed switch assembly detects a reduction or elimination of a magnetic field produced by its corresponding magnet as the magnet moves away from the reed switch assembly as door 100 is opened. In response, the reed switch assembly transmits a message to central security monitoring device 108 indicative of a local alarm condition, e.g., door 100 has been opened. Central security monitoring device 108 receives these signals and may take one or more predefined actions in response thereto, such as contacting remote monitoring station 112 via wide-area network 114, causing a siren (not shown) located within and/or outside building 103 to sound, and/or illuminating one or more lights located in or around building 103.

Central security monitoring device 108 may additionally contact an owner or resident of building 103 via text message, email or voice call, to alert the owner or resident that a door or window had been opened, that motion had been detected at building 103, or some other anomaly. In response, a user who receives such a notification from central security monitoring device 108 may take one or more actions, such as sending a command to central security monitoring device 108 to reset security system 101, to stop sounding a siren, to stop illuminating any lights that may have been activated by central security monitoring device 108, and/or to call authorities such as the police to investigate building 103.

Remote monitoring station 112 provides professional security monitoring services for homes and businesses equipped with security systems such as the one shown in FIG. 1. In response to receiving a signal from central monitoring station 108, personnel at remote monitoring station 112 may call or otherwise contact a homeowner or other building occupant associated with building 103 to verify whether a break-in has occurred or whether the signal generated by central monitoring station 108 was a false alarm, i.e., a building occupant opened a monitored door or window while security system 101 was armed. If no response to the call or other communication is received, authorities may be summoned to building 103 by the remote monitoring station 112 personnel.

Wide-area network 114 allows central security monitoring device 108 to communicate with remote monitoring station 112, in one embodiment, via gateway 118. Gateway 118 comprises a device that allows digital communications between various devices in building 103 and other, remote digital devices via wide-area network 114. In one embodiment, gateway 118 comprises an IP-based router, commonly found in homes that allow computers to communicate with remote web sites via IP-based protocols over the Internet. In another embodiment, central security monitoring device 108 and gateway 118 may comprise a single unit with capabilities of both devices, e.g., receiving/sending information from/to sensors and taking certain predetermined actions, described above, and potentially receiving commands or instructions from remote devices to take certain actions in response. Wide-area network 114 comprises one or more communication networks, such as the Internet, PSTN networks, fiber optic networks, cellular networks, satellite networks and/or other communication networks to provide communications between central security monitoring device 108, remote monitoring station 112 and personal communication device 116. Personal communication device 116 comprises a cellular telephone, smart phone, desktop or portable computer, tablet computer, wearable, or some other device that can receive communications from central security monitoring device 108 and provide notifications to a user of personal communication device 116. In this embodiment, gateway 118 provides signals from the central security monitoring device 108 to remote monitoring station 112 and to personal communication device 116 via wide-area network 114.

Central security monitoring device 108 monitors sensors 104 and 106, and other security devices (for example, tilt sensors, shock sensors, glass breakage detectors, etc.) that may be part of security system 101 for signals from the sensors indicative of an unauthorized entry into building 103. Central monitoring device 108 may provide status information to users via a display, e.g., by providing a visual indication of the status ("open", "closed", "on", "off", "normal", "alarm", etc.) of each barrier alarm device, other security devices in the system, or the system as a whole.

Figure 2:
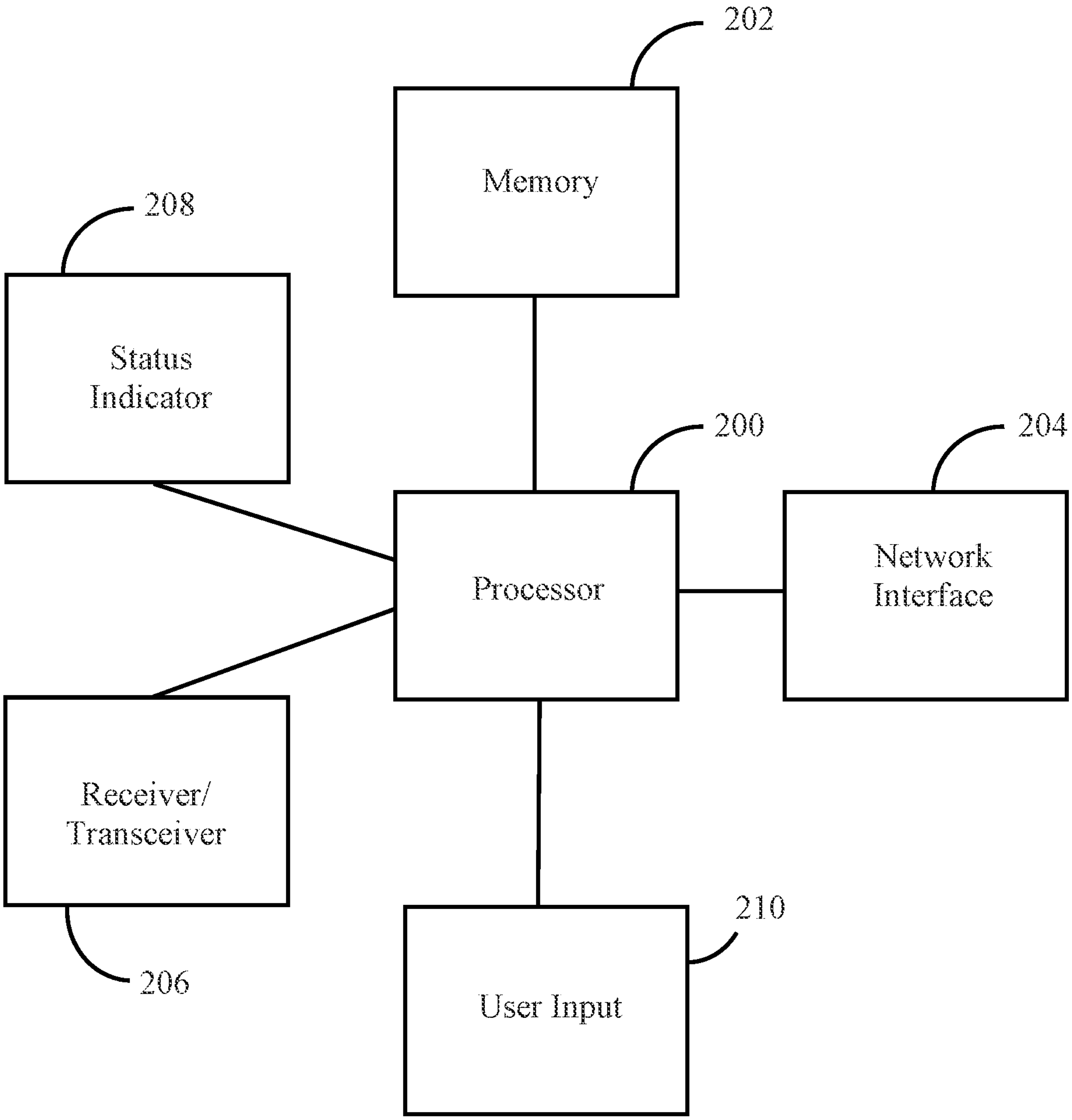
FIG. 2 is a functional block diagram of a central security monitoring device shown in FIG. 1.

FIG. 2 illustrates a functional block diagram of central security monitoring device 108. Specifically, FIG. 2 shows processor 200, memory 202, network interface 204, receiver (or transceiver) 206, optional status indicator 208, and optional user input 210. It should be understood that not all of the functional blocks shown in FIG. 2 are required for operation of central controller 116 (for example, status indicator 208 and/or user input 210), that the functional blocks may be connected to one another in a variety of ways other than what is shown in FIG. 2, and that not all functional blocks necessary for operation of central controller 116 are shown (such as a power supply), for purposes of clarity.

Processor 200 is configured to provide general operation of central security monitoring device 108 by executing processor-executable instructions stored in memory 202, for example, executable computer code. Processor 200 typically comprises a general purpose microprocessor or microcontroller, manufactured by well-known companies such as Intel Corporation of Santa Clara, California, Atmel of San Jose, California, and STMicroelectronics based in Geneva, Switzerland.

Memory 202 comprises one or more information storage devices, such as RAM, ROM, EEPROM, UVPROM, flash memory, SD memory, XD memory, or other type of electronic, optical, or mechanical information storage device. Memory 202 is used to store the processor-executable instructions for operation of central security monitoring device 108 as well as any information used by processor 200, such as information pertaining to the number, type, location, serial number, etc. of sensors in security system 101, identification information of central security monitoring device 108, such as a serial number, contact information pertaining to remote monitoring station 112, users, owners, and/or occupants of building 103, various door and window status information (e.g., "open", "closed", times when a door or window was opened or closed), and/or other information.

Network interface 204 comprises circuitry necessary for central security monitoring device 108 to communicate with remote devices/entities, such as gateway 118 and/or directly with remote monitoring station 112 and/or personal communication device 116. Such circuitry comprises one or more of a T1/T3 interface circuitry, Ethernet circuitry, and/or wireless communication circuitry, all of which is well-known in the art.

Receiver 206 comprises circuitry necessary to wirelessly receive electronic signals from the sensors, either wirelessly and/or by wired means. Such circuitry is well known in the art and may comprise BlueTooth, Wi-Fi, RF, optical, and ultrasonic circuitry, telephone wiring, twisted pair, two-conductor pair, CAT wiring, AC power wires, or other type of wiring. In one embodiment, receiver 206 is replaced by a transceiver, for allowing two-way communication between central security monitoring device 108 and the sensors and/or other devices, such as home automation and control devices.

Optional status indicator 208 is used to convey the status of one or more sensors, a particular "zone" of building 103, and/or security system 101 in general. Status indicator 208 may comprise one or more LEDs, LCDs, seven segment displays, electronic displays, or any other device for providing a visual status, and/or it may comprise a device capable of emitting audible tones, messages, alerts, etc., that also indicates one or more statuses.

Optional user interface 210 comprises hardware and/or circuitry for allowing a user to interact with central security monitoring device 108. For example, a user may arm or disarm security system 101, typically by pushing one or more keys of a keypad that comprises user input 210. Security systems typically operate in at least three modes, an "armed-away" mode, an "armed-home", and an unarmed mode. The armed-away mode typically causes central security monitoring device 108 to perform one or more actions when an alarm signal is received from any one sensor, including door/window sensors or motion sensors. The armed-home mode typically causes central security monitoring device 108 to perform one or more actions only when an alarm signal from a barrier alarm device is received. In other words, alarm signals generated by motion sensors and other occupancy sensors (such as thermal detectors or floor pressure sensors) are ignored by central security monitoring device 108. The unarmed mode generally causes central security monitoring device 108 to ignore any alarm signal received from any sensor.

Figure 3A:
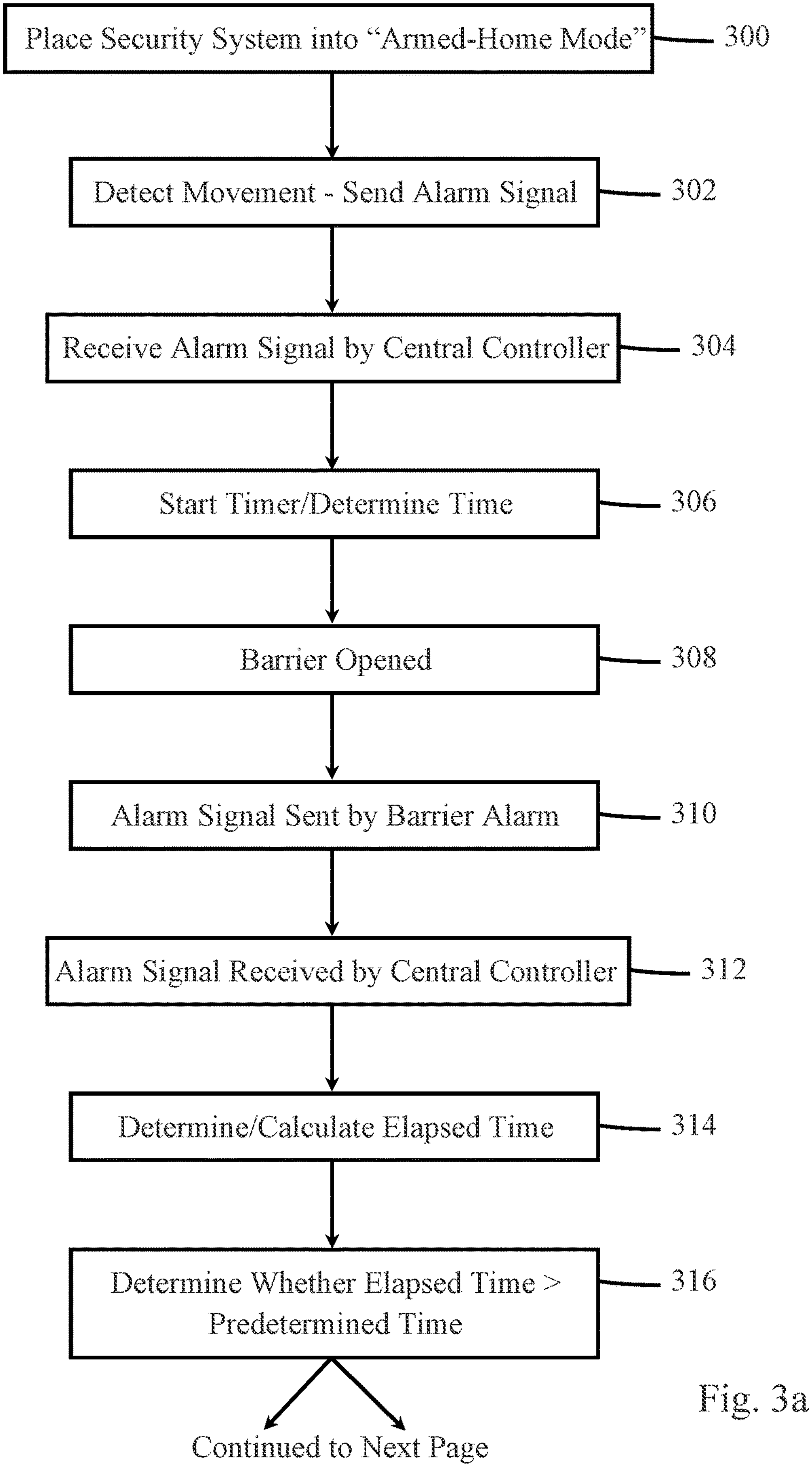
FIGS. 3*a* and 3*b* are flow diagrams illustrating one embodiment of a method performed by the central security monitoring device shown in FIGS. 1 and 2 for reducing or preventing the occurrence of false alarms.
Figure 3B:
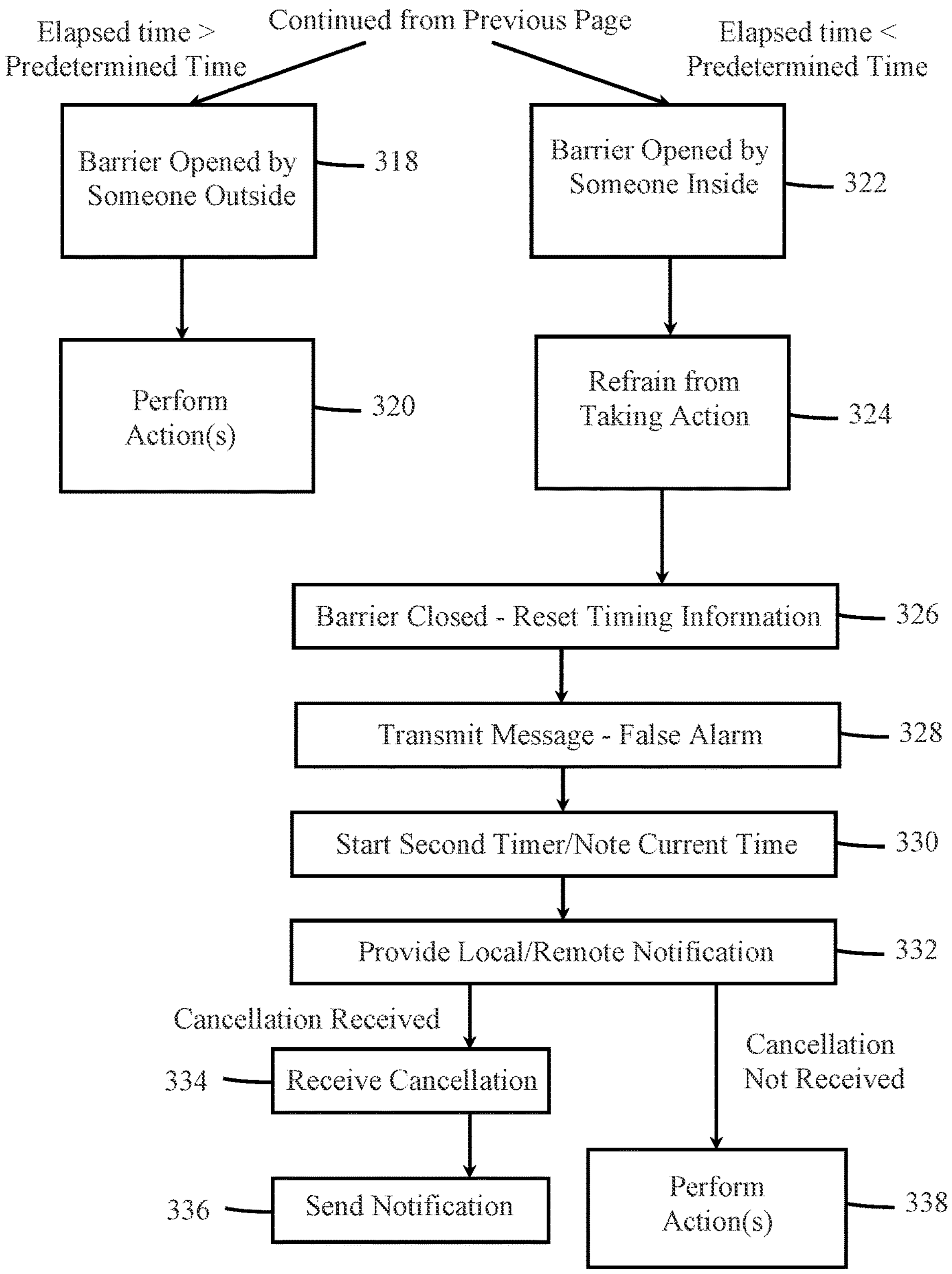

FIG. 3 is a flow diagram illustrating one embodiment of a method performed by central security monitoring device 108 for reducing or preventing the occurrence of false alarms. It should be understood that in some embodiments, not all of the steps shown in FIG. 3 are performed. It should also be understood that the order in which the steps are carried out may be different in other embodiments.

At block 300, security system 101 is placed into the armed-home mode via user interface 210 or by some other means, such as by using a smartphone having communication capability with central security monitoring device 108 either directly or indirectly via wide-area network 114, local network provided by gateway 118.

At block 302, a person inside building 103 moves across a room monitored by occupancy sensor 110. In response, occupancy sensor 110 transmits an alarm signal to central security monitoring device 108, indicating that the room is being occupied.

At block 304, central security monitoring device 108 receives the alarm signal sent by occupancy sensor 110 via receiver 206.

At block 306, processor 200 starts a timer in response to central security monitoring device 108 receiving the alarm signal. Alternatively, processor 200 determines a time that the alarm signal was received and stores the time in memory 202.

At block 308, the person who moved across the room opens a door or window that is monitored by a barrier alarm device. In this example, door 100 is opened.

At block 310, door sensor 104 transmits an alarm signal to central security monitoring device 108, indicating that door 100 has been opened.

At block 312, central security monitoring device 108 receives the alarm signal sent by door sensor 104 via receiver 206.

At block 314, processor 200 determines an elapsed time by the timer that was started at block 306. Alternatively, processor 200 determines a time that the alarm signal from door sensor 104 was received and calculates an elapsed time by subtracting the time that the alarm signal from door sensor 104 was received from the time that the alarm signal from occupancy sensor 110 was received.

At block 316, processor 200 compares the elapsed time to a predetermined time stored in memory 202. The predetermined time relates to an estimated time between when occupancy sensor 110 detects the presence of a person and when that person opens a door or window. For example, if a monitored door or window is opened by someone inside building 103, motion of the person will be detected by occupancy sensor 110 as the person approaches the door or window. When motion is detected just before a door or window is opened, this typically indicates that the door or window has been opened by someone inside building 103, and it would be desirable if such an occurrence would not cause central security monitoring device 108 to take any action based on receiving the alarm signal from the door or window sensor. Thus, the predetermined time should be chosen to account for detection of a person moving through a room as he or she approaches a door or window, but not too long, as an unauthorized person could enter through the door or window without triggering action by central security monitoring device 108. In one embodiment, the predetermined time value is 10 seconds.

When a person moves across a room, triggering occupancy sensor 110, and does not open a door or window within the predetermined time period, processor 200 resets the elapsed time to zero, or otherwise erases or ignores the time stored in memory 202 that the alarm signal was received from the occupancy sensor 110.

At block 318, when the elapsed time is greater than the predetermined time, this indicates that the door or window was opened by someone outside building 103, because motion inside building 103 was not detected within the predetermined time before the door or window was opened.

At block 320, in response to determining that the elapsed time is greater than the predetermined time, processor 200 causes central security monitoring device 108 to take one or more actions, as directed by the processor-executable instructions stored in memory 202. For example, processor 200 may cause central security monitoring device 108 to contact remote monitoring station 112, sound one or more local sirens, illuminate one or more local lights, and/or notify personal communication device 116 that an alarm condition has occurred, indicating that an unauthorized entry had been detected by one of the sensors.

At block 322, when the elapsed time is less than the predetermined time, this is a strong indication that the door or window was opened by someone inside building 103, because motion inside building 103 was detected within the predetermined time prior to the door or window being opened. In this case, it is undesirable for central security monitoring device 108 to take any action, because this scenario exemplifies a false alarm, where security system 101 was set to armed-home, but a monitored door or window was opened by an authorized person inside building 103, such as a home owner, or friends and family of the homeowner. In this case, at block 324, central security monitoring device 108 does not perform any of the actions normally performed upon receipt of an alarm signal from door alarm 104 or window alarm 106.

At block 326, the person who opened the door or window may return the door or window to the closed position. When this occurs, a closed status signal is transmitted from door sensor 104 or window sensor 106 indicating that the door or window has been closed. In response to receiving the closed status signal, processor 200 may reset the elapsed time, or otherwise erase or ignore the time stored in memory 202 associated with receipt of the alarm signal from occupancy sensor 110.

At block 328, processor 200 may cause a message to be transmitted to one or more personal communication devices 116, informing the user(s) of such devices that a false alarm had just occurred. In response, a specialized software application running on one or more communication devices 116 may record the day and time of the false alarm, so that patterns of false alarms may be realized and mitigated. For example, if false alarms occur generally before 7 am, it may indicate that a particular family member who rises prior to 7 am may need to be reminded about security system 101 and that it is generally armed until 8 am, where it is automatically placed into the unarmed mode.

In some instances, an unauthorized entry may occur into building 103 within the predetermined time period described above. For example, a burglar could break through a door or window of building 103 just after a homeowner inside building 103 was sensed by occupancy sensor 110. Under the teachings of block 322, the signals received by central security monitoring device 108 would indicate a non-alarm event. In order to prevent this kind of result, in one embodiment, alternative to block 322, at block 330, in response to determining that the elapsed time is less than the predetermined time, processor 200 may start a second timer or otherwise note the current time, to allow a person inside building 103 a cancellation time period to notify central security monitoring device 108 that no emergency condition exists. In this embodiment, receipt of an entry barrier alarm signal within the predetermined time period is referred to herein as a "potential alarm condition".

At block 332, processor 200 may provide a local or remote notification to the homeowner, building occupants, or one or more persons remotely located from building 103 that a potential false alarm condition has been detected, e.g., that a barrier entry device has detected an anomaly within the predetermined time from when motion was detected inside building 103. Such notification may comprise illuminating one or more lights, sounding one or more sirens, providing a text, email or phone call to one or more personal communication devices per notification information stored in memory 202, and/or by some other means known in the art. In one embodiment, the notification alerts one or more authorized persons that a potential alarm condition has been determined, and that additional actions will be taken by central security monitoring device 108 if an authorized person does not act to cancel such additional actions within the cancellation time period.

At block 334, processor 200 may receive a cancellation command from an authorized person, such as the homeowner or other building occupant, or person remotely located from building 103 to cancel such additional actions, via user interface 210 or via network interface 204 if the homeowner or other authorized person provided the cancellation command via, for example, a personal computer, cell phone, tablet computer, or wearable device. In response, processor 200 does not take the additional actions and may reset the first timer and the second timer to return to normal monitoring of the sensors within building 103. The cancellation command may comprise an indication of an identity of the authorized person who submitted the command, such as a disarm code uniquely assigned to each authorized person, an email address, a phone number, a username, or some other information that can identify an authorized person.

At block 336, processor 200 may provide a notification via text, email, phone call, or other well-known means of communication, to one or more authorized persons that a potential alarm condition was detected, but that no further action was taken by central security monitoring device 108 due to receipt of a cancellation command. The notification may provide an indication of an identity of the person who provided the command and a time that the potential alarm condition occurred, the time that the cancellation command was received, or both.

At block 338, when a cancellation command is not received within the cancellation time period, as determined by processor 200, processor 200 takes additional actions as directed by the processor-executable instructions stored in memory 202. For example, processor 200 may cause central security monitoring device 108 to contact remote monitoring station 112, sound one or more local sirens, illuminate one or more local lights, and/or contact one or more personal communication devices 116, indicating that an alarm condition, e.g., an unauthorized entry, had been detected by one of the sensors.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method performed by a central security monitoring device of a security system, comprising:

receiving a first alarm signal from a first sensor of the security system;

receiving a second alarm signal from a second sensor of the security system;

determining that the second alarm signal was received within a predetermined time after receipt of the first alarm signal;

determining that a cancellation command has not been received within a second predetermined time from when the second alarm signal was received; and in response to determining that the cancellation command has not been received within the second predetermined time from when the second alarm signal was received, causing a notification to occur.

2. The method of claim 1, further comprising:

in response to determining that the second alarm signal was received within a predetermined time after receipt of the first alarm signal, generating a second notification, the second notification indicating that a potential alarm condition has occurred.

3. The method of claim 1, wherein the first sensor comprises a motion detector.

4. The method of claim 1, wherein the second sensor comprises a barrier alarm device.

5. The method of claim 2, wherein the second notification is selected from the group consisting of causing illumination of one or more lights, causing one or more sirens to sound, contacting a remote monitoring station, and notifying one or more personal communication devices that the second alert has occurred.

6. The method of claim 2, further comprising:

receiving a command to place the central security monitoring device into an armed-away mode of operation; and generating the second notification immediately upon receipt of the first alarm signal.

7. The method of claim 1, further comprising:

receiving the cancellation command within the second predetermined time from when the second alarm signal was received; and in response to receiving the cancellation command, cancelling the alert and the second alert.

8. The method of claim 1, further comprising:

determining that the second alarm signal was not received within the predetermined time after receipt of the first alarm signal; and in response to determining that the second alarm signal was not received within the predetermined time after receipt of the first alarm signal, causing a second notification to occur, the second notification indicative of an unauthorized person entering a structure monitored by the first and second sensors.

9. A central security monitoring device of a security system, comprising:

a wireless receiver for receiving alarm signals from a first sensor and a second sensor;

a memory for storing processor-executable instructions;

a processor, coupled to the memory and the receiver, for executing the processor-executable instructions that causes the central security monitoring device to:

receive a first alarm signal from a first sensor of the security system;

receive a second alarm signal from a second sensor of the security system;

determine that the second alarm signal was received within a predetermined time after receipt of the first alarm signal;

determine that a cancellation command has not been received within a second predetermined time from when the second alarm signal was received; and in response to determining that the cancellation command has not been received within the second predetermined time from when the second alarm signal was received, cause a notification to occur.

10. The central security monitoring device of claim 9, wherein the processor-executable instructions comprise further instructions that causes the central security monitoring device to:

in response to determining that the second alarm signal was received within a predetermined time after receipt of the first alarm signal, generate a second notification, the second notification indicating that a potential alarm condition has occurred.

11. The central security monitoring device of claim 9, wherein the first sensor comprises a motion detector.

12. The central security monitoring device of claim 9, wherein the second sensor comprises a barrier alarm device.

13. The central security monitoring device of claim 10, wherein the second notification is selected from the group consisting of causing illumination of one or more lights, causing one or more sirens to sound, contacting a remote monitoring station, and notifying one or more personal communication devices that the second alert has occurred.

14. The central security monitoring device of claim 10, wherein the processor-executable instructions comprise further instructions that causes the central security monitoring device to:

receive a command to place the central security monitoring device into an armed-away mode of operation; and generate the second notification immediately upon receipt of the first alarm signal.

15. The central security monitoring device of claim 9, wherein the processor-executable instructions comprise further instructions that causes the central security monitoring device to:

receive the cancellation command within the second predetermined time from when the second alarm signal was received; and in response to receiving the cancellation command, cancel the alert and the second alert.

16. The central security monitoring device of claim 9, wherein the processor-executable instructions comprise further instructions that causes the central security monitoring device to:

determine that the second alarm signal was not received within the predetermined time after receipt of the first alarm signal; and in response to determining that the second alarm signal was not received within the predetermined time after receipt of the first alarm signal, cause a second notification to occur, the second notification indicative of an unauthorized person entering a structure monitored by the first and second sensors.

* * * * *